(12) United States Patent
Gong

(10) Patent No.: US 6,192,476 B1
(45) Date of Patent: Feb. 20, 2001

(54) CONTROLLING ACCESS TO A RESOURCE

(75) Inventor: Li Gong, Menlo Park, CA (US)

(73) Assignee: Sun Microsystems, Inc., Mountain View, CA (US)

(*) Notice: Under 35 U.S.C. 154(b), the term of this patent shall be extended for 0 days.

(21) Appl. No.: 08/988,431

(22) Filed: Dec. 11, 1997

(51) Int. Cl.$^7$ .................................................. H04L 9/00
(52) U.S. Cl. ...................... 713/201; 713/152; 709/229
(58) Field of Search .......................... 713/200, 201–202, 713/152–153, 154, 117, 187, 188; 308/4; 714/38, 48; 395/704; 709/229

(56) References Cited

U.S. PATENT DOCUMENTS

| 4,809,160 | * | 2/1989 | Mahon et al. ...................... 364/200 |
| 5,311,591 | | 5/1994 | Fischer ................................... 380/4 |
| 5,649,099 | | 7/1997 | Theimer et al. ..................... 713/201 |
| 5,720,033 | * | 2/1998 | Deo ....................................... 713/200 |
| 5,745,678 | * | 4/1998 | Herzberg et al. ................... 713/200 |
| 5,758,153 | * | 5/1998 | Atsatt et al. ........................ 395/614 |
| 5,845,129 | * | 12/1998 | Wendorf et al. ..................... 395/726 |
| 5,892,904 | * | 4/1999 | Atkinson et al. .................... 713/201 |
| 5,915,085 | * | 6/1999 | Koved .................................. 713/200 |
| 5,987,608 | * | 11/1999 | Roskind .............................. 713/200 |

FOREIGN PATENT DOCUMENTS

| 2259590A | 3/1993 | (GB) ................................. G06F/9/44 |
| 2308688A | 7/1997 | (GB) ................................. G06F/12/14 |

OTHER PUBLICATIONS

Dean, D., et al., "Java Security: From HotJava to Netscape and Beyond," Proceedings of the 1996 IEEE Symposium on Security and Privacy, Oakland, CA, May 6–8, 1996.

Hamilton, M.A., "Java and the Shift to Net–Centric Computing," Computer, vol. 29, No. 8, Aug., 1996.

Gong Li, et al.: "Going Beyond the Sandbox: An Overview of the New Security Architecture in the Java™ Development Kit 1.2", Proceedings Of The Usenix Symposium On Internet Technologies And Systems, Monterey, CA, USA, Dec. 8–11, 1997,ISBN 1–880446–91–S, 1997, Berkeley, CA, USA, Usenix Assoc., USA, pp. 103–112, XP–002100907.

Wallach, D. S., et al.: "Extensible Security Architectures for Java", 16$^{th}$ ACM Symposium On Operating Systems Principles, Sain Malo, France, Oct. 5–8 1997, ISSN 0163–5980, Operating Systems Review, Dec. 1997, ACM, USA, pp. 116–128, XP–002101681.

* cited by examiner

Primary Examiner—Robert W. Beausoliel, Jr.
Assistant Examiner—Scott T. Baderman
(74) Attorney, Agent, or Firm—McDermott, Will & Emery

(57) ABSTRACT

A method and system are provided for determining whether a principal (e.g. a thread) may access a particular resource. According to one aspect of the invention, the access authorization determination takes into account the sources of the code on the call stack of the principal at the time the access is desired. Because the source of the code on the call stack will vary over time, so will the access rights of the principal. Thus, when a request for an action is made by a thread, a determination is made of whether the action is authorized based on permissions associated with routines in a calling hierarchy associated with the thread. The determination of whether a request is authorized is based on a determination of whether at least one permission associated with each routine encompasses the permission required to perform the requested action. Support for "privileged" routines is also provided. When a routine in the calling hierarchy is privileged, the determination of whether an action is authorized is made by determining whether at least one permission associated with each routine between and including the privileged routine and a second routine in the calling hierarchy encompasses the permission required to perform the requested action.

21 Claims, 4 Drawing Sheets

CONTROLLING ACCESS TO A RESOURCE

RELATED APPLICATIONS

The present application is related to U.S. patent application Ser. No. 08/988,857, entitled "TYPED, PARAMETERIZED, AND EXTENSIBLE ACCESS CONTROL PERMISSIONS", filed by Li Gong, on the equal day herewith, the contents of which are incorporated herein by reference.

The present application is related to U.S. patent application Ser. No. 08/988,660, entitled "SECURE CLASS RESOLUTION, LOADING, AND DEFINITION", filed by Li Gong, on the equal day herewith, the contents of which are incorporated herein by reference.

The present application is related to U.S. patent application Ser. No. 08/988,439, entitled "PROTECTION DOMAINS TO PROVIDE SECURITY IN A COMPUTER SYSTEM", filed by Li Gong, on the equal day herewith, the contents of which are incorporated herein by reference.

FIELD OF THE INVENTION

The present invention relates to security mechanisms in a computer system.

BACKGROUND OF THE INVENTION

As the use of computer systems grows, organizations are becoming increasingly reliant upon them. A malfunction in the computer system can severely hamper the operation of such organizations. Thus organizations that use computer systems are vulnerable to users who may intentionally or unintentionally cause the computer system to malfunction.

One way to compromise the security of a computer system is to cause the computer system to execute software that performs harmful actions on the computer system. There are various types of security measures that may be used to prevent a computer system from executing harmful software. One example is to check all software executed by the computer system with a "virus" checker. However, virus checkers only search for very specific software instructions. Many methods of using software to tamper with a computer's resources would not be detected by a virus checker.

Another very common measure used to prevent the execution of software that tampers with a computer's resources is the "trusted developers approach". According to the trusted developers approach, system administrators limit the software that a computer system can access to only software developed by trusted software developers. Such trusted developers may include, for example, well know vendors or in-house developers.

Fundamental to the trusted developers approach is the idea that computer programs are created by developers, and that some developers can be trusted to not have produced software that compromises security. Also fundamental to the trusted developers approach is the notion that a computer system will only execute programs that are stored at locations that are under control of the system administrators.

Recently developed methods of running applications involve the automatic and immediate execution of software code loaded from remote sources over a network. When the network includes remote sources that are outside the control of system administrators, the trusted developers approach does not work.

One attempt to adapt the trusted developers approach to systems that can execute code from remote sources is referred to as the trusted source approach. Key to the trusted source approach is the notion that the location from which a program is received (e.g. the "source" of the program) identifies the developer of the program. Consequently, the source of the program may be used to determine whether the program is from a trusted developer. If the source is associated with a trusted developer, then the source is considered to be a "trusted source" and execution of the code is allowed.

One implementation of the trusted source approach is referred to as the sand box method. The sand box method allows all code to be executed, but places restrictions on remote code. Specifically, the sand box method permits all trusted code full access to a computer system's resources and all remote code limited access to a computer system's resources. Trusted code is usually stored locally on the computer system under the direct control of the owners or administrators of the computer system, who are accountable for the security of the trusted code.

One drawback to the sandbox approach is that the approach is not very granular. The sandbox approach is not very granular because all remote code is restricted to the same limited set of resources. Very often, there is a need to permit remote code from one source access to one set of computer resources while permitting remote code from another source access to another set of computer resources. For example, there may be a need to limit access to one set of files associated with one bank to remote code loaded over a network from a source associated with that one bank, and limit access to another set of files associated with another bank to remote code loaded over a network from a source associated with the other bank.

Providing security measures that allow more granularity than the sand box method involves establishing a complex set of relationships between principals and permissions. A "principal" is an entity in the computer system to which permissions are granted. Examples of principals include processes, objects and threads. A "permission" is an authorization by the computer system that allows a principal to perform a particular action or function.

The task of assigning permissions to principals is complicated by the fact that sophisticated processes may involve the interaction of code from multiple sources. For example, code from a trusted first source being executed by a principal (c.g. thread) may cause the execution of code from a trusted second source, and then cause execution of code from an untrusted third source. Even though the principal remains the same when the code from the trusted second source and code from the untrusted third source is being executed, the access privileges appropriate for the principal when code from the trusted second source is being executed likely differ from access privileges appropriate for the principal when the code from the untrusted third source is being executed. Thus, access privileges appropriate for a principal may change dynamically as the source of the code being executed by the principal changes.

Based on the foregoing, it is clearly desirable to develop a security method which can determine the appropriate access privileges for principals. It is further desirable to provide a security method that allows permissions to change dynamically when code from one source causes the execution of code from another source.

SUMMARY OF THE INVENTION

A method and apparatus for determining the access rights of principals is provided. According to one aspect of the invention, access rights for a principal are determined dynamically based on the source of the code that is currently being executed by the principal (e.g. thread, process)

According to one aspect of the invention, when a request for an action by a thread is detected, a determination is made of whether the action is authorized based on permissions associated with routines in a calling hierarchy associated with the thread. A calling hierarchy indicates the routines (e.g. functions, methods) that have been invoked by or on behalf of a principal (e.g. thread, process) but have not been exited.

In one embodiment, the association between permissions and routines is based on an association between routines and classes and between classes and protection domains. Thus, for example, a first routine may be associated with a first set of permissions, which correspond to the permissions belonging to the protection domain associated with the code source of the first routine's associated class. A second routine may be associated with a second set of permissions, which correspond to the permissions belonging to the protection domain associated with the code source of the second routine's associated class. The determination of whether a particular request is authorized is based on a determination of whether at least one permission associated with each routine in the calling hierarchy encompasses the permission required to perform the requested action. For example, a determination of whether a particular request is authorized is based on determining whether (1) at least one permission from a first set of permissions associated with the first routine in a calling hierarchy encompass the permission required, and (2) at least one permission of a second set of permissions associated with the second routine in the calling hierarchy encompass the permission required.

According to another aspect of the invention, certain routines may be "privileged". A privileged routine is allowed to perform certain actions even if the routine that called the privileged routine does not have permission to perform those same actions.

According to one embodiment, a flag in a frame in the calling hierarchy corresponding to a privileged routine is set to indicate that the privileged routine is privileged. A frame is a data element in a calling hierarchy that corresponds to an invocation of a routine (e.g. function, method) that has not been exited. When a first routine in the calling hierarchy is privileged, the determination of whether an action is authorized is made by determining whether at least one permission associated with each routine between and including the first routine and a second routine in the calling hierarchy encompasses the permission required to perform the requested action. The permissions of the routines preceding the privileged routine in the calling hierarchy are ignored.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for determining authorization to perform actions on a computer system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
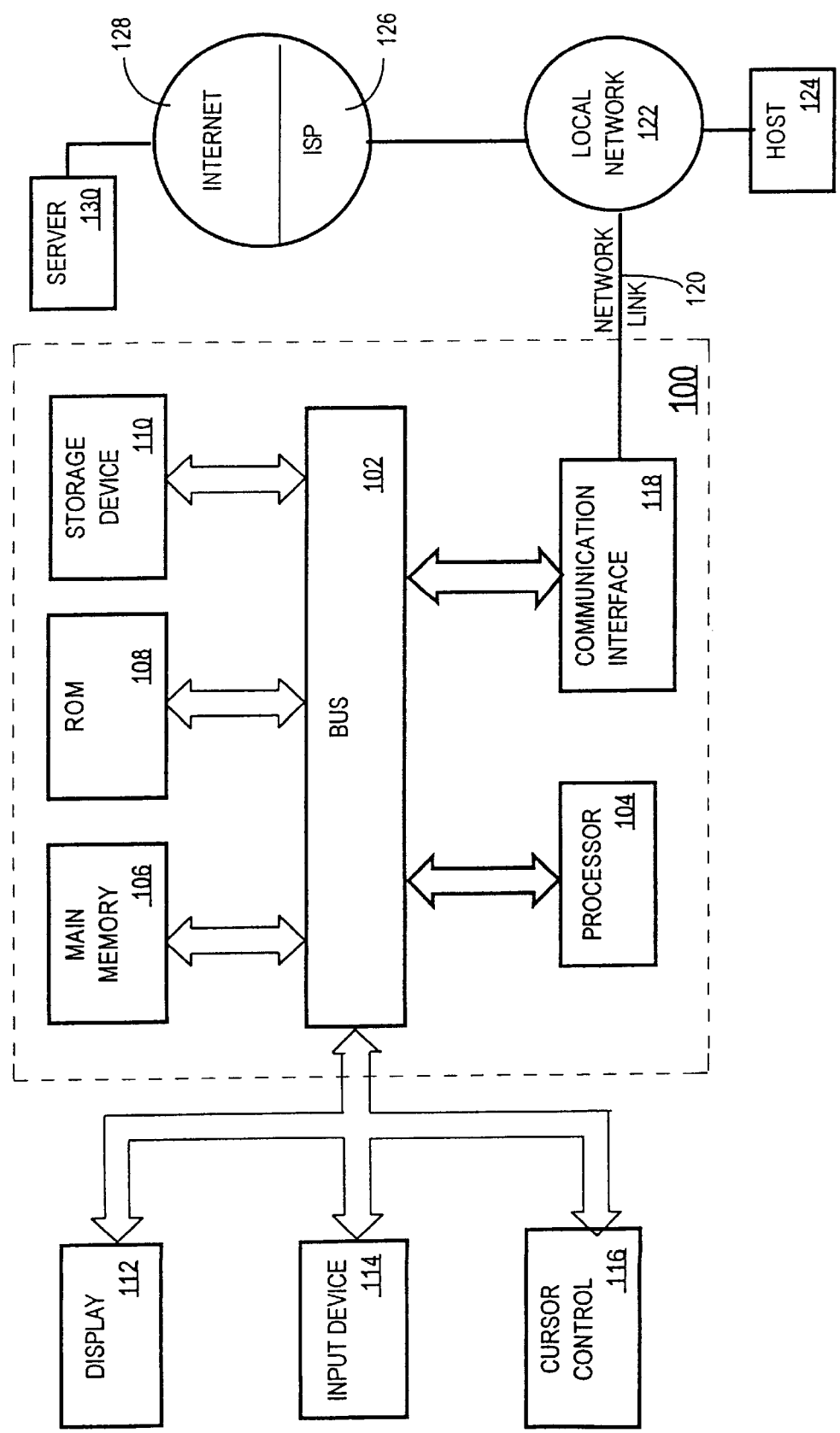
FIG. 1 is a block diagram of a computer system on which the present invention may be implemented in accordance with an embodiment of the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for determining authorization to perform actions on a computer system. According to one embodiment of the invention, determining authorization to perform actions on a computer system is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for determining authorization to perform actions on a computer system as described herein.

The received code may be executed by processor 104 as it is received, and/or stored in storage device 110, or other non-volatile storage for later execution. In this manner, computer system 100 may obtain application code in the form of a carrier wave.

FUNCTIONAL OVERVIEW

A security enforcement mechanism is provided in which the access permissions of a principal, such as a thread, are allowed to vary over time based on the source of the code currently being executed. When a routine that arrives from a trusted source is executing, the thread executing the routine is typically allowed greater access to resources. When the same thread is executing a routine from an untrusted source, the thread is typically allowed more restricted access to resources. When a routine calls another routine, the thread executing the routines is associated with permissions common to both routines, and is thus is restricted to a level of access that is lesser than or equal to the level access allowed for either routine.

The mechanism allows certain routines to be "privileged". When determining whether a thread is able to perform an action, only the permissions associated with the privileged routine and the routines above the privileged routine in the calling hierarchy of the thread are inspected.

According to one embodiment, the security mechanism described herein uses permission objects and protection domain objects to store information that models the security policy of a system. The nature and use of these objects, as well as the techniques for dynamically determining the time-variant access privileges of a principal, are described hereafter in greater detail.

EXEMPLARY SECURITY MECHANISM

Figure 2:
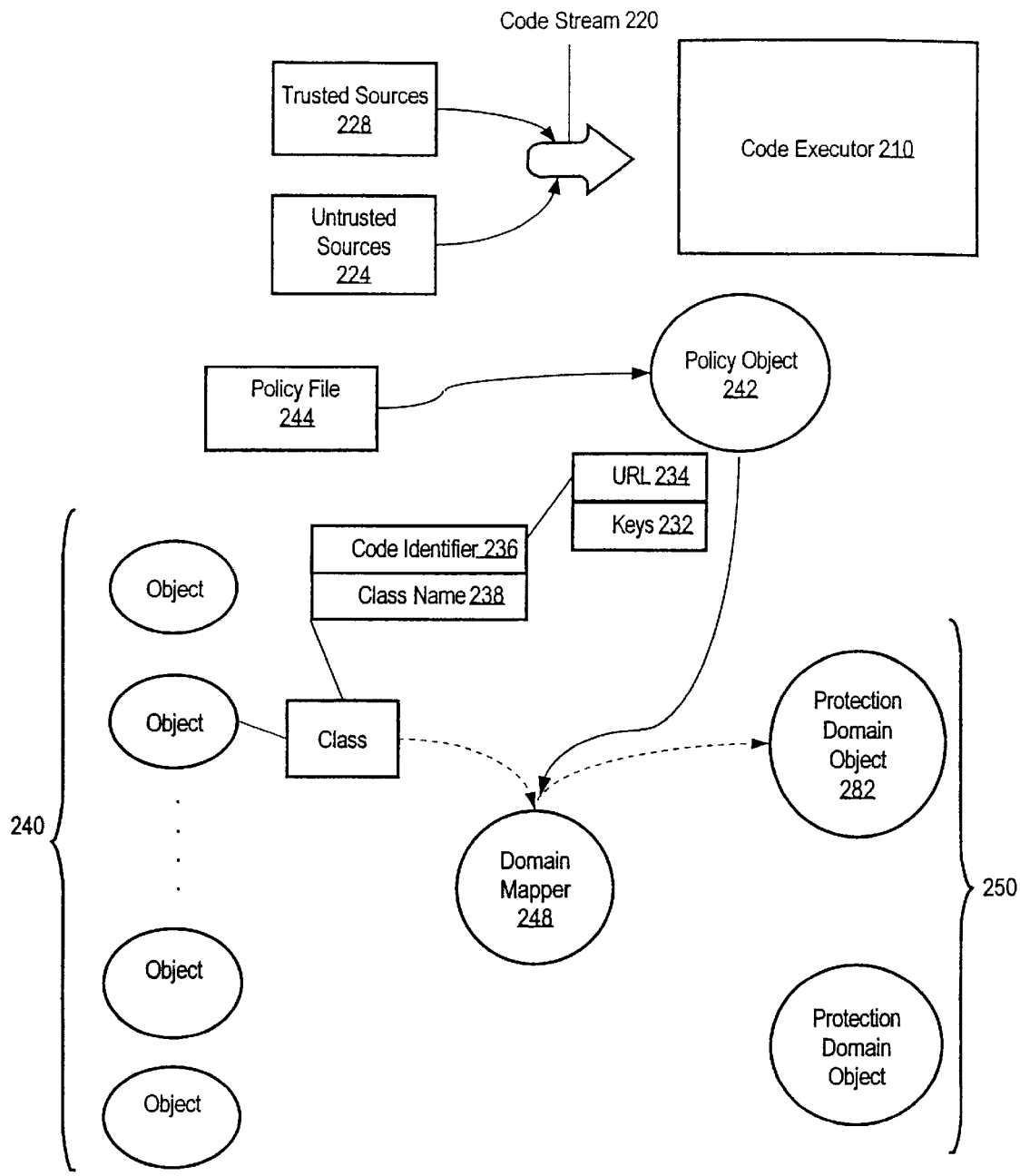
FIG. 2 is a block diagram showing exemplary protection domain objects, a code executor, classes, and objects created by the code executor in accordance with an embodiment of the present invention.

An exemplary security mechanism illustrating the use of protection domains is shown in FIG. 2. Referring to FIG. 2, the exemplary security mechanism includes a policy file 244, a policy object 240, a domain mapper object 248, an access controller 280, and one or more protection domains 282. The security mechanism is implemented using a code executor 210.

Code executor 210 executes code which code executor 210 receives from code stream 220. One example of a code executor is a Java virtual machine. A Java virtual machine interprets code called byte code. Byte code is code generated by a Java compiler from source files containing text. The Java virtual machine is described in detail in Tim Lindholm & Frank Yellin, *The Java Virtual Machine Specification* (1996).

For the purposes of explanation, it shall be assumed that code from code stream 220 is object oriented software. Consequently, the code is in the form of methods associated with objects that belong to classes. In response to instructions embodied by code executed by code executor 210, code executor 210 creates one or more objects 240. An object is a record of data combined with the procedures and functions that manipulate the record. All objects belong to a class. Each object belonging to a class has the same fields ("attributes") and the same methods. The methods are the procedures, functions, or routines used to manipulate the object. An object is said to be an "instance" of the class to which the object belongs.

One or more class definitions are contained in code from code stream 220. The fields and methods of the objects belonging to a class are defined by a class definition. These class definitions are used by code executor 210 to create objects which are instances of the classes defined by the class definitions.

These class definitions are generated from source code written by a programmer. For example, a programmer using a Java Development Kit enters source code that conforms to the Java programming language into a source file. The source code embodies class definitions and other instructions which are used to generate byte code which controls the execution of a code executor (i.e. a Java virtual machine). Techniques for defining classes and generating code executed by a code executor, such as a Java virtual machine, are well known to those skilled in the art.

Each class defined by a class definition from code stream 220 is associated with a class name 238 and a code source 236. Code executor 210 maintains an association between a class and its class name and code source. The code source represents a source of code. A "source of code" is an entity from which computer instructions are received. Examples of sources of code include a file or persistent object stored on a data server connected over a network, a FLASH_EPROM reader that reads instructions stored on a FLASH_EPROM, or a set of system libraries.

In one embodiment of the present invention, the code source may be a composite record containing a uniform resource locator ("URL") 234 and set of public cryptographic keys 236. A URL identifies a particular source. The URL is a string used to uniquely identify any server connected to the world wide web. A URL may also be used to designate sources local to computer system 100. Typically, the URL includes the designation of the file and directory of the file that is the source of the code stream that a server is providing.

A public cryptographic key, herein referred to as a key, is used to validate the digital signature which may be included in a file used to transport related code and data. Public cryptographic keys and digital signatures are described in Schneier, *Applied Cryptography*, (1996). The keys may be contained in the file, may be contained in a database associating keys with sources (e.g. URLs), or be accessible using other possible alternative techniques.

A class may be associated with the digital signature associated with the file used to transport code defining the class, or the class definition of the class may be specifically associated with a digital signature. A class that is associated with a valid digital signature is referred to as being signed. Valid digital signatures are digital signatures that can be verified by known keys stored in a database. If a class is associated with a digital signature which can not be verified, or the class is not associated with any digital signature, the class is referred to as being unsigned. Unsigned classes may be associated with a default key. A key may be associated with a name, which may be used to look up the key in the database.

While one code source format has been described as including data indicating a cryptographic key and URL, alternate formats are possible. Other information indicating the source of the code, or combinations thereof, may be used to represent code sources. Therefore, it is understood that the present invention, is not limited to any particular format for a code source.

TRUSTED AND UNTRUSTED SOURCES

The source of code stream 220 may be from zero or more untrusted sources 224 or zero or more trusted sources 228. Untrusted sources 224 and trusted sources 228 may be file servers, including file servers that are part of the World Wide Web network of servers connected to the Internet. An untrusted source is typically not under the direct control of the operators of computer system 100. Code from untrusted sources is herein referred to as untrusted code.

Because untrusted code is considered to pose a high security risk, the set of computer resources that untrusted code may access is usually restricted to those which do not pose security threats. Code from a trusted source is code usually developed by trusted developers. Trusted code is considered to be reliable and pose much less security risk than remote code.

Software code which is loaded over the network from a remote source and immediately executed is herein referred to as remote code. Typically, a remote source is a computer system of another separate organization or individual. The remote source is often connected to the Internet.

Normally untrusted code is remote code. However, code from sources local to computer system 100 may pose a high security risk. Code from such local sources may be deemed to be untrusted code from an untrusted source. Likewise, code from a particular remote source may be considered to be reliable and to pose relatively little risk, and thus may be deemed to be trusted code from a trusted resource.

According to one embodiment of the invention, an access controller is used in conjunction with protection domains to implement security policies that allow trusted code to access more resources than untrusted code, even when the trusted and untrusted code are executed by the same principal. A security policy thus established determines what actions code executor 210 will allow the code within code stream 220 to perform. The use of typed permissions and protection domains allows policies that go beyond a simple trusted/untrusted dichotomy by allowing relatively complex permission groupings and relationships.

Protection domains and policies that may be used in conjunction with typed permissions shall now be described in greater detail with continued reference to FIG. 2.

PROTECTION DOMAINS AND PERMISSIONS

According to an embodiment of the present invention, protection domains are used to enforce security within computer systems. A protection domain can be viewed as a set of permissions granted to one or more principals. A permission is an authorization by the computer system that allows a principal to execute a particular action or function. Typically, permissions involve an authorization to perform an access to a computer resource in a particular manner. An example of an authorization is an authorization to "write" to a particular directory in a file system (e.g. /home).

A permission can be represented in numerous ways in a computer system. For example, a data structure containing text instructions can represent permissions. An instruction such as "permission write /somedirectory/somefile" denotes a permission to write to file "somefile" in the directory "/somedirectory." The instruction denotes which particular action is authorized, and the computer resource upon which that particular action is authorized. In this example, the particular action authorized is to "write." The computer resources upon which the particular action is authorized is a file ("/somedirectory/somefile") in a file system of computer system 100. Note that in the example provided the file and the directory in which the file is contained are expressed in a conventional form recognized by those skilled in the art.

Permissions can also be represented by objects, herein referred to as permission objects. Attributes of the object represent a particular permission. For example, an object can contain an action attribute of "write," and a target resource attribute of "/somedirectory." A permission object may have one or more permission validation methods which determine whether a requested permission is authorized by the particular permission represented by the permission object.

POLICIES

The correlation between permissions and principals constitutes the security policy of the system. The policy of the system may be represented by one or more files containing instructions. Each instruction establishes a mapping between a particular code identifier and a particular authorized permission. The permission identified in an instruction applies to all objects that belong to the classes that are associated with the code identifier identified in the instruction.

FIG. 2 illustrates an exemplary policy implemented through use of a policy file 244. The format of an instruction in exemplary policy file 244 is:

<"permission"> <URL> <key name> <action> <target>
The combination of the <URL> and the key that corresponds to <key name> constitute a code identifier; the <action> and <target> represent a permission. A key is associated with a key name. The key and the corresponding key name are stored together in a key database. The key name can be used to find the key in the key database. For example, consider the following instruction:

File://somesource some key write /tmp/* The above instruction represents an authorization of a permission to write to any file in "/tmp/*" by any object that belongs to the class associated with code identifier "file://somesource" -"some key" (i.e. URL-key name).

IMPLIED PERMISSIONS

One permission does not have to exactly match another permission to be considered "encompassed" by the other permission. When a first permission encompasses a second permission without matching the second permission, the first permission is said to "imply" the second permission. For example, a permission to write to any file in a directory, such "c:/", implies a permission to write to any specific file in the directory, such as "c:/thisfile".

If a permission is represented by a permission object, the validation method for the permission object contains code for determining whether one permission is implied by another. For purposes of illustration, a permission to write to any file in a directory implies a permission to write to any specific file in that directory, and a permission to read from any file in a directory implies a permission to read from any specific file in that directory, however, a permission to write does not imply a permission to read.

POLICY IMPLEMENTING OBJECTS

A variety of objects may be used to implement the policy represented by the code identifiers to permissions mapping contained in policy file 244. According to the embodiment illustrated in FIG. 2, in order to efficiently and conveniently implement the policy, policy object 242, domain mapper object 248, and one or more protection domain objects 250 are provided.

Policy object 242 is an object for storing the policy information obtained, for example, from policy file 244. Specifically, policy object 242 provides a mapping of code identifiers to permissions, and is constructed based on the instructions within policy file 244. Within the policy object 242, the code identifiers and their associated authorized permissions may be represented by data structures or objects.

Protection domain objects 250 are created on demand when new classes are received by code executor 210. When a new class is received, domain mapper 248 determines whether a protection domain is already associated with the code identifier. The domain mapper maintains data indicating which protection domains have been created and the code identifiers associated with the protection domains. If a protection domain is already associated with the code identifier, the domain mapper adds a mapping of the new class and protection domain to a mapping of classes and protection domains maintained by the domain mapper 248.

If a protection domain object is not associated with the code identifier of the new class, a new protection domain object is created and populated with permissions. The protection domain is populated with those permission that are mapped to the code identifier of the new class based on the mapping of code identifiers to permissions in the policy object. Finally, the domain mapper adds a mapping of the new class and protection domain to the mapping of classes and protection domains as previously described.

In other embodiments of the invention, instead of storing the mapping of classes to protection domains in a domain mapper object, the mapping is stored as static fields in the protection domain class. The protection domain class is the class to which protection domain objects belong. There is only one instance of a static field for a class no matter how many objects belong to the class. The data indicating which protection domains have been created and the code sources associated with the protection domains is stored in static fields of the protection domain class. Alternatively, a mapping between a class and protections domains associated with the class is stored as static fields in the class.

Static methods are used to access and update the static data mentioned above. Static methods are invoked on behalf of the entire class, and may be invoked without referencing a specific object.

EXEMPLARY CALL STACK

The permission objects, protection domain objects and policy objects described above are used to determine the access rights of a thread. According to an aspect of the invention, such access rights vary over time based on what code the thread is currently executing, and which code invoked the code that is currently executing. The sequence of calls that resulted in execution of the currently executing code of a thread is reflected in the call stack of the thread.

Figure 3:
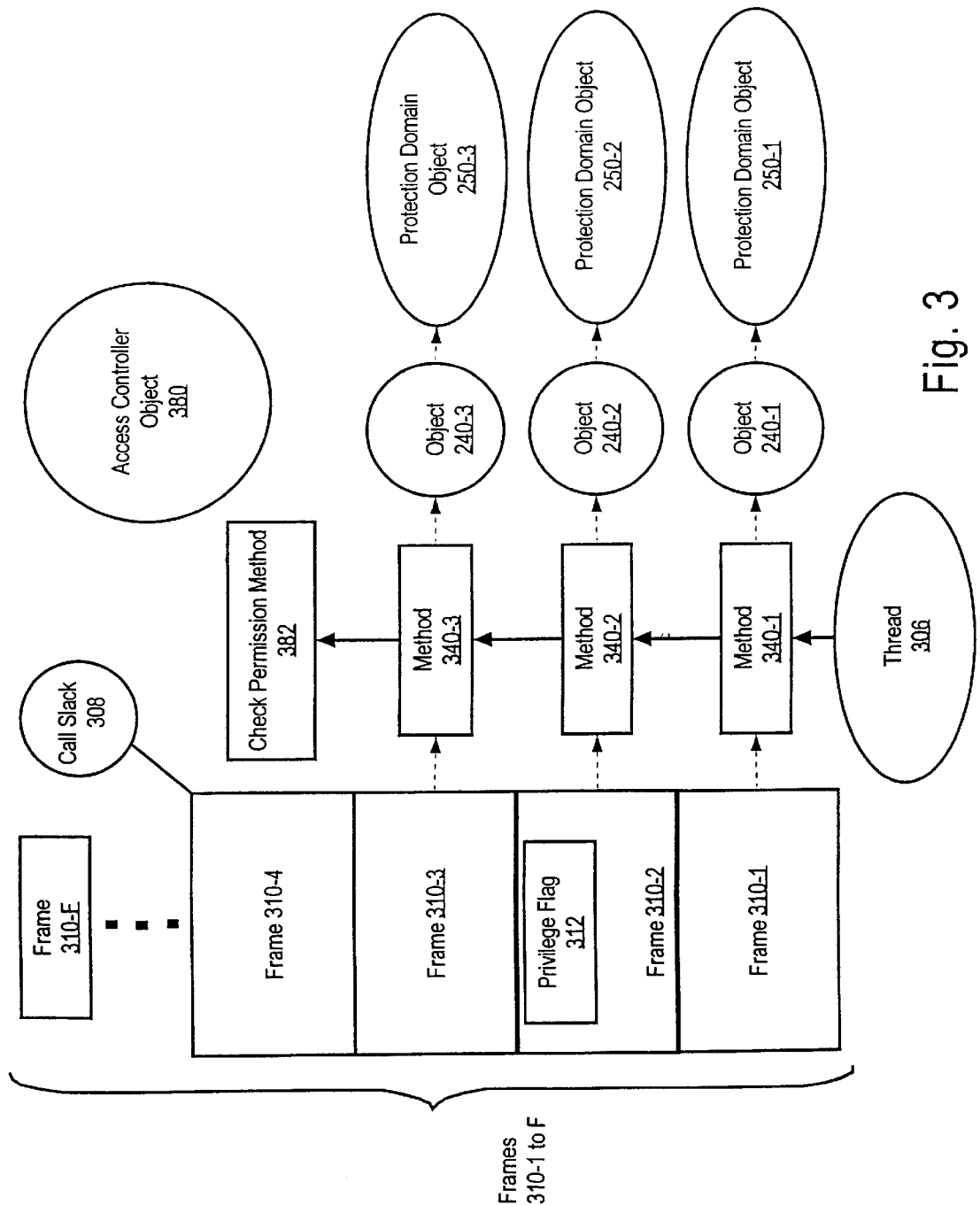
FIG. 3 is a block diagram illustrating an exemplary access controller, call stack, protection domain, and the object and methods being executed by a thread sending a request to determine whether an action is authorized to the access controller in accordance with an embodiment of the present invention.

FIG. 3 illustrates an example of a call stack of a thread as it exists at a particular point in time. Reference to the exemplary call stack shall be made to explain the operation of a security mechanism that enforces access rights in a way that allows the rights of the thread to vary over time.

Referring to FIG. 3, it is a block diagram that includes a call stack 308 associated with a thread 306 in which the method 340-1 of an object 240-1 calls the method 340-2 of another object 240-2 that calls the method 340-3 of yet another object 240-3 that calls a check permission method 382 of an access controller object 380.

Thread 306 is a thread executing on computer system 100. Call stack 308 is a stack data structure representing a calling hierarchy of the methods invoked by thread 306 at any given instance. At the instance illustrated in FIG. 3, call stack 308 contains a frame 310 for each invocation of a method by a thread and not exited by that thread.

Each frame 310 corresponds to the method that has been called but not exited by thread 306. The relative positions of the frames on the call stack 308 reflect the invocation order of the methods that correspond to the frames. When a method is exited, the frame 310 that corresponds to the method is removed from the top of the call stack 308. When a method is invoked, a frame corresponding to the method is added to the top of the call stack 308.

Each frame contains information about the method and object that correspond to the frame. From this information the class of method can be determined by invoking a "get class" method provided for every object by the code executor 210. From the mapping in domain mapper object 248, the protection domain associated with the class, object, and method for given frame 310 can be determined.

For example, assume thread 306 invokes method 340-1. While executing method 340-1 thread 306 invokes method 340-2, while executing method 340-2 thread 306 invokes method 340-3, and while executing method 340-3 thread 306 invokes method 382. At this point, call stack 308 represents the calling hierarchy of methods as shown in FIG. 3. Frame 310-4 corresponds to method 382, frame 310-3 to method 340-3, method 340-2 to frame 310-2, and method 340-1 to frame 310-1. When thread 306 exits method 382, frame 310-4 is removed from the stack.

METHOD/PERMISSION RELATIONSHIPS

Each method on the call stack is associated with a set of permissions. The set of permissions for a given method is determined by the protection domain associated with the source from which the code for the given method was received. The relationship between methods, protection domains and permissions shall now be described with continued reference to FIG. 3.

For the purposes of illustration, it shall be assumed that Object 240-1 corresponds to part of a user interface. The code associated with the class to which object 240-1 belongs is received from a remote source. File access for remote code by default is limited to a default directory in accordance with the security policy of the administrators of computer system 100.

Protection domain object 250-1 is mapped to the class of object 240-1. Protection domain object 250-1 is associated with two permissions, which are a permission to "write" to "e:/tmp" and to "read" from "e:/tmp." Therefore, method 340-1 is authorized to write and read from "e:/tmp".

Method 340-1 invokes method 340-2 of object 240-2. Object 240-2 is a password manager that is associated with methods for managing passwords for computer system 100. Passwords are contained in two files, "c:/sys/pwd" and "d:/sys/pwd." Method 340-2 is a method that adds a password to one of the files.

Protection domain object 250-2 is mapped to the class of object 240-2. Accordingly, protection domain object 250-2 contains two permissions, a permission to "write" to "c:/sys/pwd" and a permission to write to "d:/sys/pwd."

Method 340-2 invokes method 340-3 of object 240-3. Object 240-3 is a resource manager that contains methods for managing a system directory disk "d:/sys". Method 340-3 is a method to update a record in a file in the directory "d:/sys".

Protection domain object 250-3 is mapped to the class of object 240-3. Accordingly, protection domain object 250-3 is associated with two permissions: a permission to "write" to "d:/sys/*" and a permission to read to "read" from "d:/sys/*".

While protection domain objects are used to organize and determine the access rights of a particular method, some mechanism must be provided to determine the access rights of a thread whose call stack contains multiple methods whose code arrived from multiple sources. According to one embodiment of the invention, this determination is performed by an access controller, as shall be described in greater detail hereafter.

EXEMPLARY ACCESS CONTROLLER

According to an embodiment of the invention, an access controller is used to determine whether a particular action may be performed by a principal. Specifically, before a resource management object accesses a resource, the resource management object (e.g. object 340-3) invokes a check permission method of an access controller object 380. In the illustrated example, the resource manager method 340-3 invokes a check permission method 382 of access controller object 380 to determine whether access to the password file is authorized. To make this determination, the check permission method 282 of the access controller 380 performs the steps that shall be described hereafter with reference to FIG. 4.

DETERMINING WHETHER AN ACTION IS AUTHORIZED

According to an embodiment of the invention, an action is authorized if the permission required to perform the action is included in each protection domain associated with the thread when a request to determine an authorization is made. A permission is said to be included in a protection domain if that permission is encompassed by one or more permissions associated with the protection domain. For example, if an action requires permission to write to file in the "e:/tmp" directory, then that required permission is included in protection domain object 250-1 because protection domain object 250-1 is explicitly associated with that permission.

Assume that thread 306 is executing method 310-3 when thread 306 makes a request for a determination of whether an action is authorized by invoking the check permission method 382. Assume further that thread 306 has invoked method 340-1, method 340-2, and method 310-3 has not exited them when thread 306 invoked method 382. The protection domains associated with thread 306 when the request for a determination of authorization is made are represented by protection domain object 250-1, protection domain object 250-2, and protection domain object 250-3.

Note that given the calling hierarchy present in the current example, the required permission to perform an action of writing to file "d:/sys/pwd" is not authorized for thread 306 because the required permission is not encompassed by the only permission included in protection domain object 250-1 (i.e. write to "e:/tmp").

PRIVILEDGED METHODS

Sometimes the need arises to authorize an action that a method performs irrespective of the protection domains associated with the methods that precede the method in the calling hierarchy of a thread. Updating a password is an example of when such a need arises.

Specifically, because the security of a password file is critical, the permissions required to update the password file are limited to very few specialized protection domains. Typically, such protection domains are associated with methods of objects from code that is "trusted" and that provides its own security mechanisms. For example, a method for updating a password may require the old password of a user when updating that user with a new password.

Because permissions to update passwords are limited to code from limited sources, code from all other sources will not be allowed to update the passwords. This is true even in situations such as that shown in FIG. 3, where the code from a remote source (method 340-1) attempts to change the password by invoking the trusted code (method 340-3) which has permission to update the password. Access is denied in these situations because at least one method in the calling hierarchy (method 340-1) does not have the necessary permission.

According to one embodiment of the invention, a privilege mechanism is provided to allow methods that do not themselves have the permission to perform actions to nevertheless cause the actions to be performed by calling special "privileged" methods that do have the permissions. This result is achieved by limiting the protection domains that are considered to be "associated with a thread" to only those protection domains that are associated with a "privileged" method and those methods that are subsequent to the privileged method in the calling hierarchy.

A method may cause itself to be privileged (i.e. enable the privilege mechanism) by invoking a method of a privilege object called, for example, beginPrivilege. A method may cause itself to become not privileged (i.e. disable the privilege mechanism) by invoking another method of the privilege object called, for example, end privilege. The following code example illustrates one technique for invoking methods which enable or disable the privilege mechanism. Although the code example may resemble the JAVA programming language by Sun Microsystems Inc., the example is merely for illustrative purposes and is not meant to be representative of an actual code implementation.

```
Privileged p = new Privileged();
p.beginPrivilege();
try {
    [sensitive code]
} finally {
    p.endPrivilege();
}
```

The first line of the code example creates a privilege object. The second invokes a beginPrivilege method of the privilege object that enables the privilege mechanism. The "try finally" statement ensures that the block of code following the "finally" is executed regardless of what happens during execution of the block between the "try" and "finally". Thus the privilege disabling method of the privilege object ("p.endPrivilege( )") is always invoked.

The above code can be used, for example, to bound the portion of method 340-3 that actually accesses the password file. The portion that accesses the password file would be contained in the block designated as "[sensitive code]". The technique illustrated by the above code example explicitly places the responsibility of enabling and disabling the privilege mechanism upon the programmer.

Often, while executing a privileged method, a thread may invoke subsequent methods associated with other protection domains that do not include permissions included in the privileged protection domain. When a thread is executing a subsequent method, an action requested by the thread is only authorized if the required permission is encompassed in the protection domains associated with the subsequent method and any methods in the calling hierarchy between the subsequent method and privileged method, inclusively. The advantage of the limiting the privilege mechanism in this manner is to prevent methods of untrusted code from effectively "borrowing" the permissions associated with privileged methods of trusted code when the methods of the untrusted code are invoked by the trusted methods.

In an alternate embodiment of the invention, a method causes itself to be privileged or not privileged by invoking static methods of the access controller class. The access controller class is the class to which access controller objects belong. As demonstrated in the following code example, using static methods that are associated with the access controller class avoids the need of having to create a privilege object in order to enable the privilege mechanism.

The following code example illustrates one technique for invoking methods which enable or disable the privilege mechanism. Assume for purposes of illustration that the access controller class name is AccessControl. Although the code example may resemble the Java programming language by Sun Microsystems Inc., the example is merely for illustrative purposes and is not meant to be representative of an actual code implementation.

```
AccessControl.beginPrivilege();
try {
    [sensitive code]
} finally {
    AccessControl.endPrivilege();
}
```

ENABLING INVOCATIONS

A thread may invoke the same method at different levels in a calling hierarchy. For example, a method X may call a method Y which may call method X. Consequently, a method such as method 340-2 that is invoked as a privileged method could be invoked a second time without enabling the privilege mechanism in the second invocation. To properly determine the protection domains associated with a thread while the privilege mechanism is enabled, a mechanism is provided to track which invocation of the privileged method enabled the privilege mechanism. The invocation in which a thread enables the privilege mechanism is referred to as a enabling invocation.

One technique to track which invocations of a particular method are enabling invocations is to set a flag (e.g. privilege flag 312) in the frame 310 corresponding to each enabling invocation. This may be accomplished by setting the privilege flag 312 in the frame corresponding to each enabling invocation. The flag may be set, for example, when the privilege enabling method of each privilege enabling object is invoked during execution of a method.

According to one embodiment of the invention, each frame has a privilege flag value. When any frame is added to the call stack 380, the initial value of the privilege flag indicates that the corresponding method is not privileged. The privilege flag of any frame is only set to a value indicating the corresponding method is privileged when the corresponding method enables the privilege. After a method that enables the privilege mechanism is exited, the value of the privilege flag 312 will not carry over to the next invocation of the method. The value will not carry over because when the new frame corresponding to the method is added to the call stack 308, the initial value of the privilege flag is set to indicate that the corresponding method is not privileged. Maintaining the value of the privilege status flag in this manner disables the privilege mechanism when a privileged method is exited regardless of whether the privilege mechanism is explicitly disabled by the programmer.

While one method of tracking which invocations are enabling invocation is described above, various alternative methods of tracking enabling invocations are possible. Therefore, it is understood that the present invention is not limited to any specific method for tracking enabling invocations.

Figure 4:
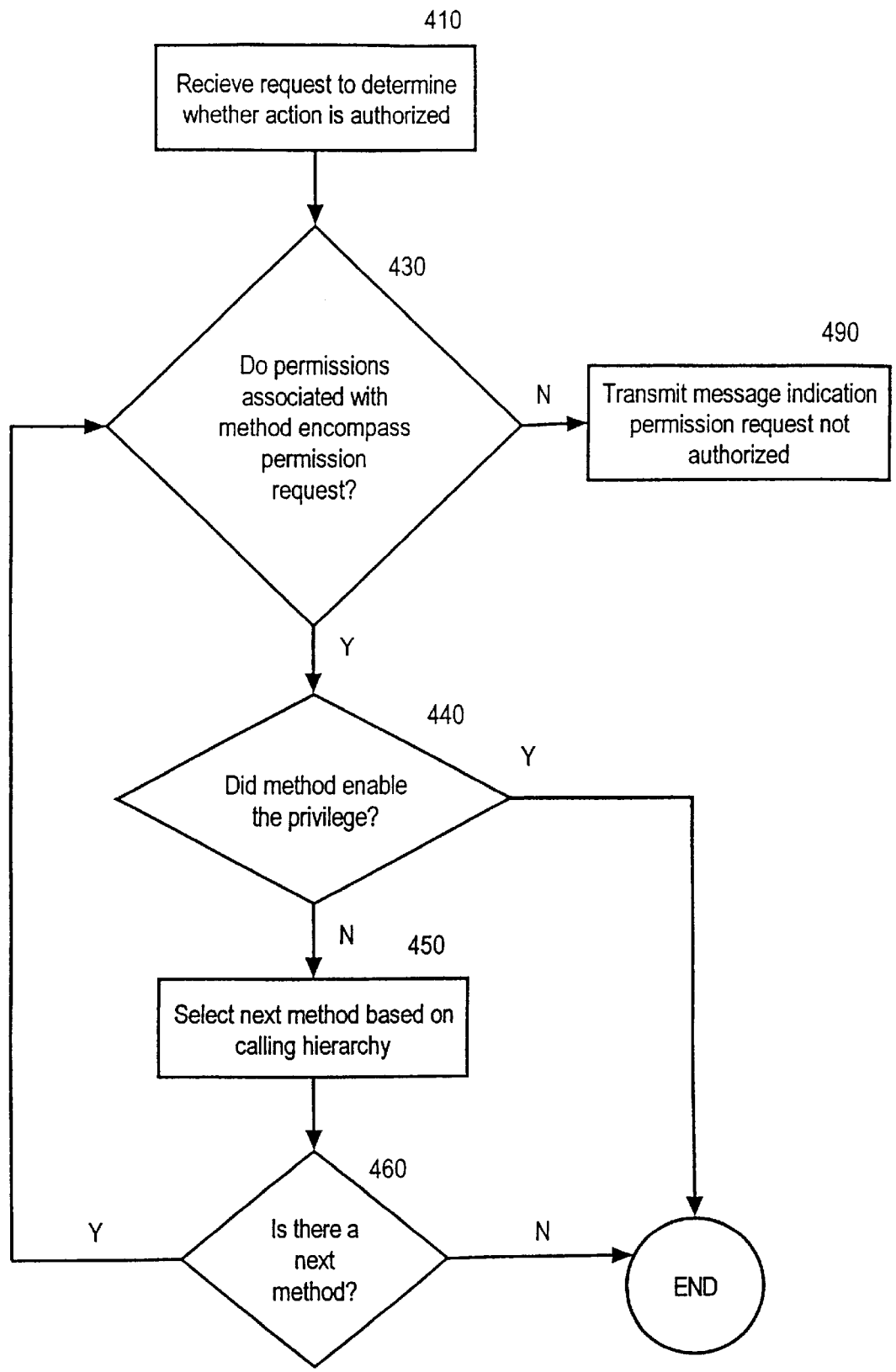
FIG. 4 is a flow chart showing the steps of a method used to determine whether an action is authorized for a thread in accordance with an embodiment of the present invention.

The method shown in FIG. 4 shall now be described with reference to the thread 306 and stack 308 illustrated in FIG. 3. Assume for example, that thread 306 is executing a user interface method 340-1 to update a password. To update the password, thread 306 then invokes method 340-2 (the method to update a password), then method 340-3 (the method to update a file). Assume further that method 340-2 is privileged.

In step 410, the request for a determination of whether an action is authorized is received. After detecting that a request for an action to update the password file has been detected by invoking method 340-3, the permission required to perform the action is determined.

In the present example, the action is updating the password file and the required permission to perform the action is "write" to file "d:/sys/pwd". A request is made to determine whether the action is authorized by invoking the check permission method 382 of the access controller 380, passing in as a parameter the permission required to perform the action. Note the current state of call stack 308 is shown in FIG. 3.

Steps 430, 440, 450 and 460 define a loop in which permissions associated with the methods in the call stack are checked. The loop continues until a privileged method is encountered, or all of the methods in the call stack of have been checked. For the purposes of explanation, the method whose privileges are currently being checked is referred to as the "selected method".

In step 430, a determination is made as to whether one of the permissions associated with the selected method encompasses the permission required. The permissions associated with a method are the permissions associated with the protection domain that is associated with the method. If the determination made in step 430 is that a permission associated with the selected method encompasses the permission required, control passes to step 440.

During the first iteration of the loop, the frame that immediately precedes the frame associated with the check permission method of the access controller is inspected. In this example, the frame associated with the check permission method 382 is frame 310-4. The frame that immediately precedes frame 310-4 is frame 310-3. Consequently, during the first iteration of the loop, frame 310-3 will be inspected. Frame 310-3 is associated with method 340-3, which is associated with protection domain 250-3. Because a permission associated with protection domain object 250-3 (permission to "write" to "d:/sys/*") encompasses the permission required (i.e. "write" to "d:/sys/pwd"), control passes to step 440.

In step 440, a determination is made of whether the invocation of a selected method represents the enabling invocation. This determination is based on the privilege flag 312 of frame 310 corresponding to the invocation of the selected method. If the determination is that the invocation of the selected method does not represent the enabling invocation, control passes to step 450. In this example, the privilege status of frame 310-3 is not set to indicate that the frame represents the enabling invocation, thus control passes to step 450.

In steps 450, the next method is selected. The next method is the method corresponding to frame below the current frame based on the calling hierarchy represented by call stack 308. In this example, the frame below the current frame 310-3 is frame 310-2. The method corresponding to frame 310-2 is method 340-2.

In step 460, a determination is made of whether a method was selected in step 450. If a method was selected, control reverts to step 430.

In the current example, control passes to step 430 because method 340-2 was selected. In step 430, the determination made is that the protection domain associated with method 340-2 (protection domain object 250-2) includes a permission encompassing the permission required ("write" to "d:/sys/pwd") because a permission associated with protection domain object 250-2 ("write" to "d:/sys/pwd") explicitly encompasses the permission required. Control passes to step 440.

In step 440, the determination made is that the invocation of a selected method represents the enabling invocation because the privilege flag 312 indicates that the invocation corresponding to frame 310-2 is an enabling invocation. A message is transmitted indicating the permission request is valid. Then, performance of the steps ends.

Note that by exiting the performance of the steps at step 440 when the selected method represents the enabling invocation, the authorization of the requested action is based on the privileged protection domain and any protection domains associated with methods invoked after the invocation of the enabling invocation.

Assume in the current example that the privilege mechanism was never invoked. Thus in step 440, the determination made is that invocation of a selected method does not represent the enabling invocation because the privilege flag 312 indicates that the invocation corresponding to frame 310-2 is not an enabling invocation.

In steps 450, the next method selected is method 340-1 because the frame below the current frame 310-2 is frame 310-1 and the method corresponding to frame 310-1 is method 340-1. In step 460, the determination made is that a next method was selected in step 450, thus control reverts to step 430.

In step 430, the determination made is that the protection domain associated with method 340-1 (protection domain object 250-1) does not include the permission required ("write" to "d:/sys/pwd") because no permission associated with protection domain object 250-1 (i.e. "e:/tmp" the only permission associated with the protection domain) encompasses the permission required. Control then passes to step 490.

In step 490, a message indicating that the requested action is not authorized is transmitted. In embodiment of the invention, the message is transmitted by throwing an exception error.

Note that when at least one protection domain associated with a thread does not include a permission encompassing the permission required, the action requested is not authorized. An action is authorized only when all the protection domains associated with a thread when making the request for a determination of whether the action is authorized include the permission required.

In one embodiment of the invention, when a thread ("parent thread") causes the spawning of another thread ("child thread"), the protection domains associated with the parent thread are "inherited" by the child thread. The protection domains may be inherited by, for example, retaining the call stack of a parent thread when the child thread is created. When the steps shown in FIG. 4 are executed to determine whether an action is authorized, the call stack that is traversed is treated as if it included the call stack of the parent thread. In another embodiment of the invention, a child thread does not inherit the protection domain of the parent thread, and, accordingly, the call stack that is traversed is treated as if it did not include the parent's call stack.

One advantage of basing the authorization of a thread to perform an action on the protection domains associated with the thread is that the permissions can be based on the source of code the thread is executing. As mentioned earlier, objects are created from class definitions in code received by code executor 210. The source of code a thread is executing is the source of code of the method. The source of code of a method is the source of the class definition used to define the class to which the method's object belongs. Because the protection domains are associated with the source of code of a method, as described previously, the permissions authorized for a thread can be based on the source of the code of each method invoked by a thread. Thus, it can be organized so that code from a particular source is associated with the permissions appropriate for security purposes.

An advantage of the privilege mechanism described above is that performance of sensitive operations in which security is critical can be limited to methods from trusted sources. Furthermore, these operations can be performed on behalf of methods based on code from less secure sources. Methods performing sensitive operations typically rely on their own security mechanisms (e.g. password authentication methods). When a thread invokes the privilege mechanism, the scope of the permissions of privileged domain, which typically entail a high security risk, are limited to the enabling invocation. This prevents a method invoked within the privileged method, such as a method based on untrusted code, from acquiring the capability to perform operations posing a high security risk.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for providing security, the method comprising the steps of:
   detecting when a request for an action is made by a principal; and
   in response to detecting the request, determining whether said action is authorized based on permissions associated with a plurality of routines in a calling hierarchy associated with said principal, wherein said permissions are associated with said plurality of routines based on a first association between protection domains and permissions.

2. The method of claim 1, wherein:
   the step of detecting when a request for an action is made includes detecting when a request for an action is made by a thread; and
   the step of determining whether said action is authorized includes determining whether said action is authorized based on an association between permissions and a plurality of routines in a calling hierarchy associated with said thread.

3. The method of claim 1, wherein:
   the calling hierarchy includes a first routine; and
   the step of determining whether said action is authorized further includes determining whether a permission required to perform said action is encompassed by at least one permission associated with said first routine.

4. The method of claim 1, wherein the step of determining whether said action is authorized further includes determining whether a permission required to perform said action is encompassed by at least one permission associated with each routine in said calling hierarchy.

5. A method for providing security, the method comprising the steps of:
   detecting when a request for an action is made by a principal,
   determining whether said action is authorized based on an association between permissions and a plurality of routines in a calling hierarchy associated with said principal;
   wherein each routine of said plurality of routines is associated with a class; and
   wherein said association between permissions and said plurality of routines is based on a second association between classes and protection domains.

6. A method for providing security, the method comprising the steps of:
   detecting when a request for an action is made by a principal; and
   in response to detecting the request, determining whether said action is authorized based on permissions associated with a plurality of routines in a calling hierarchy associated with said principal, wherein a first routine in said calling hierarchy is privileged; and
   wherein the step of determining whether said action is authorized further includes determining whether a permission required to perform said action is encompassed by at least one permission associated with each routine in said calling hierarchy between and including said first routine and a second routine in said calling hierarchy, wherein said second routine is invoked after said first routine, wherein said second routine is a routine for performing said requested action.

7. The method of claim 6, wherein the step of determining whether said permission required to perform said action is encompassed by at least one permission associated with each routine in said calling hierarchy between and including said first routine and said second routine further includes the steps of:
   determining whether said permission required is encompassed by at least one permission associated with said second routine; and
   in response to determining said permission required is encompassed by at least one permission associated with said second routine, then performing the steps of:

A) selecting a next routine from said plurality of routines in said calling hierarchy, B) if said permission required is not encompassed by at least one permission associated with said next routine, then transmitting a message indicating that said permission required is not authorized, and C) repeating steps A and B until:
said permission required is not authorized by at least one permission associated with said next routine, there are no more routines to select from said plurality of routines in said calling hierarchy, or
determining that said next routine is said first routine.

8. The method of claim 7, wherein:
the method further includes the step of setting a flag associated with said first routine to indicate that said first routine is privileged; and
the step of determining that said next routine is said first routine includes determining that a flag associated with said next routine indicates said next routine is privileged.

9. The method of claim 8, wherein the step of setting said flag associated with said first routine includes setting a flag in a frame in said calling hierarchy associated with said thread.

10. A computer-readable medium carrying one or more sequences of one or more instructions, the one or more sequences of the one or more instructions including instructions which, when executed by one or more processors, causes the one or more processors to perform the steps of:
detecting when a request for an action is made by a principal; and
in response to detecting the request, determining whether said action is authorized based on permissions associated with a plurality of routines in a calling hierarchy associated with said principal, wherein said permissions are associated with said plurality of routines based on a first association between protection domains and permissions.

11. The computer-readable medium of claim 10, wherein:
the step of detecting when a request for an action is made includes detecting when a request for an action is made by a thread; and
the step of determining whether said action is authorized includes determining whether said action is authorized based on an association between permissions and a plurality of routines in a calling hierarchy associated with said thread.

12. The computer readable medium of claim 10, wherein:
the calling hierarchy includes a first routine; and
the step of determining whether said action is authorized further includes determining whether a permission required to perform said action is encompassed by at least one permission associated with said first routine.

13. The computer readable medium of claim 10, wherein the step of determining whether said action is authorized further includes determining whether a permission required to perform said action is encompassed by at least one permission associated with each routine in said calling hierarchy.

14. A computer-readable medium bearing instructions for providing security, the instructions including instructions for performing the steps of:
detecting when a request for an action is made by a principal;
determining whether said action is authorized based on an association between permissions and a plurality of routines in a calling hierarchy associated with said principal;
wherein each routine of said plurality of routines is associated with a class; and
wherein said association between permissions and said plurality of routines is based on a second association between classes and protection domains.

15. A computer-readable medium carrying one or more sequences of one or more instructions, the one or more sequences of the one or more instructions including instructions which, when executed by one or more processors, causes the one or more processors to perform the steps of:
detecting when a request for an action is made by a principal; and
in response to detecting the request, determining whether said action is authorized based on permissions associated with a plurality of routines in a calling hierarchy associated with said principal, wherein a first routine in said calling hierarchy is privileged; and
wherein the step of determining whether said action is authorized further includes determining whether a permission required to perform said action is encompassed by at least one permission associated with each routine in said calling hierarchy between and including said first routine and a second routine in said calling hierarchy, wherein said second routine is invoked after said first routine, wherein said second routine is a routine for performing said requested action.

16. The computer readable medium of claim 15, wherein the step of determining whether said permission required to perform said action is encompassed by at least one permission associated with each routine in said calling hierarchy between and including said first routine and said second routine further includes the steps of:
determining whether said permission required is encompassed by at least one permission associated with said second routine; and
in response to determining said permission required is encompassed by at least one permission associated with said second routine, then performing the steps of:
A) selecting a next routine from said plurality of routines in said calling hierarchy,
B) if said permission required is not encompassed by at least one permission associated with said next routine, then transmitting a message indicating that said permission required is not authorized, and
C) repeating steps A and B until:
said permission required is not authorized by at least one permission associated with said next routine, there are no more routines to select from said plurality of routines in said calling hierarchy, or
determining that said next routine is said first routine.

17. The computer readable medium of claim 16, wherein:
the computer readable medium further comprises one or more instructions for performing the step of setting a flag associated with said first routine to indicate that said first routine is privileged; and
the step of determining that said next routine is said first routine includes determining that a flag associated with said next routine indicates said next routine is privileged.

18. The computer readable medium of claim 17, wherein the step of setting said flag associated with said first routine includes setting a flag in a frame in said calling hierarchy associated with said thread.

19. A computer system comprising:
a processor;

a memory coupled to said processor;

said processor being configured to detect when a request for an action is made by a principal; and said processor being configured to respond to detecting the request by determining whether said action is authorized based on permissions associated with a plurality of routines in a calling hierarchy associated with said principal, wherein said permissions are associated with said plurality of routines based on a first association between protection domains and permissions.

20. The computer system of claim 19, wherein:

the calling hierarchy includes a first routine; and said processor is configured to determine whether said action is authorized by determining whether a permission required to perform said action is encompassed by at least one permission associated with said first routine.

21. The computer system of claim 19, wherein said processor is configured to determine whether said action is authorized by determining whether a permission required to perform said action is encompassed by at least one permission associated with each routine in said calling hierarchy.

* * * * *

(12) EX PARTE REEXAMINATION CERTIFICATE (9913th)

United States Patent
Gong

(10) Number: US 6,192,476 C1
(45) Certificate Issued: Oct. 29, 2013

(54) CONTROLLING ACCESS TO A RESOURCE

(75) Inventor: Li Gong, Menlo Park, CA (US)

(73) Assignee: Sun Microsystems, Inc., Mountain View, CA (US)

Reexamination Request:
No. 90/011,521, Mar. 1, 2011

Reexamination Certificate for:
Patent No.: 6,192,476
Issued: Feb. 20, 2001
Appl. No.: 08/988,431
Filed: Dec. 11, 1997

(51) Int. Cl.
*G06F 7/04* (2006.01)
*H04N 7/16* (2011.01)
*H04L 29/06* (2006.01)
*G06F 21/62* (2013.01)

(52) U.S. Cl.
CPC ............ *H04L 63/08* (2013.01); *G06F 21/6218* (2013.01)
USPC ................................. 726/4; 709/229; 713/152

(58) Field of Classification Search
None
See application file for complete search history.

(56) References Cited

To view the complete listing of prior art documents cited during the proceeding for Reexamination Control Number 90/011,521, please refer to the USPTO's public Patent Application Information Retrieval (PAIR) system under the Display References tab.

*Primary Examiner* — Dennis Bonshock

(57) ABSTRACT

A method and system are provided for determining whether a principal (e.g. a thread) may access a particular resource. According to one aspect of the invention, the access authorization determination takes into account the sources of the code on the call stack of the principal at the time the access is desired. Because the source of the code on the call stack will vary over time, so will the access rights of the principal. Thus, when a request for an action is made by a thread, a determination is made of whether the action is authorized based on permissions associated with routines in a calling hierarchy associated with the thread. The determination of whether a request is authorized is based on a determination of whether at least one permission associated with each routine encompasses the permission required to perform the requested action. Support for "privileged" routines is also provided. When a routine in the calling hierarchy is privileged, the determination of whether an action is authorized is made by determining whether at least one permission associated with each routine between and including the privileged routine and a second routine in the calling hierarchy encompasses the permission required to perform the requested action.

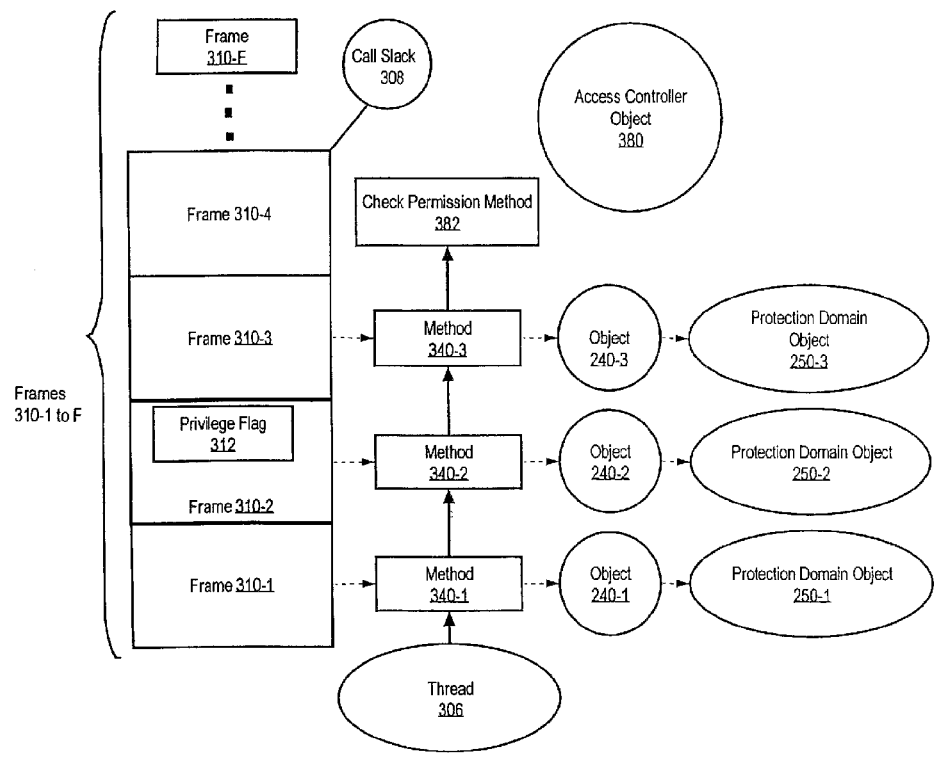

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-21 is confirmed.

\* \* \* \* \*